(12) United States Patent
De Smet et al.

(10) Patent No.: US 11,876,676 B2
(45) Date of Patent: Jan. 16, 2024

(54) NETWORK NODE FIRMWARE UPDATE

(71) Applicant: NXP USA, Inc., Austin, TX (US)

(72) Inventors: Bruno De Smet, Valbonne (FR); Gatien Chapon, Villeneuve-Loubet (FR)

(73) Assignee: NXP USA, Inc, Austin, TX (US)

( * ) Notice: Subject to any disclaimer, the term of this patent is extended or adjusted under 35 U.S.C. 154(b) by 257 days.

(21) Appl. No.: 17/061,841

(22) Filed: Oct. 2, 2020

(65) Prior Publication Data

US 2021/0119858 A1 Apr. 22, 2021

(30) Foreign Application Priority Data

Oct. 16, 2019 (EP) .................................... 19306347
Mar. 9, 2020 (EP) .................................... 20161888

(51) Int. Cl.
*H04L 41/082* (2022.01)
*G06F 16/22* (2019.01)
*G06F 8/61* (2018.01)
*G06F 8/65* (2018.01)
*G06F 8/71* (2018.01)

(52) U.S. Cl.
CPC .............. *H04L 41/082* (2013.01); *G06F 8/61* (2013.01); *G06F 8/65* (2013.01); *G06F 8/71* (2013.01); *G06F 16/2219* (2019.01)

(58) Field of Classification Search
CPC . H04L 41/082; H04L 45/028; G06F 16/2219; G06F 8/61; G06F 8/60; G06F 8/65; G06F 8/71; G06F 11/1433
USPC .................................................. 709/221, 222
See application file for complete search history.

(56) References Cited

U.S. PATENT DOCUMENTS

| 667,842 | A | 2/1901 | Ingalls |
| 7,165,173 | B1 | 1/2007 | Herle |
| 7,581,459 | B2 | 9/2009 | Gourjon |
| 7,845,430 | B2 | 12/2010 | Johnson et al. |
| 8,255,775 | B2 | 8/2012 | Chang et al. |
| 8,576,241 | B1 | 11/2013 | Kanter et al. |
| 8,713,137 | B2 * | 4/2014 | Ji ........................ G06F 11/1433 709/221 |

(Continued)

FOREIGN PATENT DOCUMENTS

CA 2970362 A1 12/2017

OTHER PUBLICATIONS

Chandra et al.: "Internet of Things: Over-the-Air (OTA) Firmware Update in LightweightMesh Network Protocol for Smart Urban Development", The 22nd Asia-Pacific Conference on Communications (APCC2016), pp. 115-118.

(Continued)

*Primary Examiner* — Thu Ha T Nguyen

(57) ABSTRACT

An apparatus and method for updating the firmware version in a network node is described. The firmware is divided into a plurality of blobs, each blob having an associated blob version. Each blob version is associated with a firmware version. The method includes receiving notification from a client server network node of an updated version of a first blob and the compatible versions of the remaining blobs. A blob upgrade order is determined from the first blob updated version, the remaining blobs compatible versions, and the remaining blobs current versions. Each blob is upgraded in the blob upgrade order. The client is restarted after each blob upgrade.

15 Claims, 9 Drawing Sheets

(56) References Cited

U.S. PATENT DOCUMENTS

| | | | | |
|---|---|---|---|---|
| 8,719,810 | B2* | 5/2014 | Oh | G06F 8/658 |
| | | | | 717/173 |
| 8,825,815 | B2* | 9/2014 | Gidron | H04L 67/34 |
| | | | | 709/221 |
| 8,977,594 | B2* | 3/2015 | Whitehead | H04L 67/01 |
| | | | | 707/639 |
| 9,787,522 | B1* | 10/2017 | Contreras | H04L 63/0485 |
| 10,127,036 | B2 | 11/2018 | Moeller et al. | |
| 10,205,606 | B2 | 2/2019 | Klitenik et al. | |
| 10,838,705 | B2* | 11/2020 | Riedl | H04L 67/12 |
| 10,924,347 | B1* | 2/2021 | Narsian | H04L 47/12 |
| 10,990,372 | B2* | 4/2021 | Sarkar | G06F 8/63 |
| 11,164,014 | B1* | 11/2021 | Ghadiok | G06V 10/82 |
| 11,322,017 | B1* | 5/2022 | Ghadiok | G08G 1/0112 |
| 11,343,348 | B1* | 5/2022 | Stevens | H04L 67/568 |
| 11,455,234 | B2* | 9/2022 | Ghare | G06F 11/3664 |
| 11,606,754 | B2* | 3/2023 | Dondoneau | H04W 88/16 |
| 11,734,056 | B1* | 8/2023 | Verma | G06F 9/3836 |
| | | | | 718/102 |
| 11,747,463 | B2* | 9/2023 | Nagpal | A61B 5/1113 |
| | | | | 342/59 |
| 2004/0098715 | A1 | 5/2004 | Aghera et al. | |
| 2005/0039178 | A1* | 2/2005 | Marolia | H04W 8/245 |
| | | | | 717/174 |
| 2005/0149575 | A1* | 7/2005 | Baune | G06F 16/1794 |
| 2005/0160432 | A1* | 7/2005 | Gallagher | G06F 16/2443 |
| | | | | 719/313 |
| 2005/0278715 | A1* | 12/2005 | Herle | G06F 8/658 |
| | | | | 717/162 |
| 2007/0061467 | A1* | 3/2007 | Essey | G06Q 30/06 |
| | | | | 709/227 |
| 2007/0079306 | A1* | 4/2007 | Qumei | G06F 9/44521 |
| | | | | 717/168 |
| 2009/0187610 | A1* | 7/2009 | Guo | G06F 16/219 |
| | | | | 707/999.203 |
| 2011/0258426 | A1* | 10/2011 | Mujtaba | G06F 21/57 |
| | | | | 713/168 |
| 2015/0261966 | A1* | 9/2015 | Mensch | H04L 63/0876 |
| | | | | 713/189 |
| 2015/0271446 | A1* | 9/2015 | Browne | H04N 7/15 |
| | | | | 348/14.08 |
| 2015/0277986 | A1* | 10/2015 | Zhang | G06F 9/441 |
| | | | | 713/2 |
| 2016/0117162 | A1* | 4/2016 | Searle | H04L 41/40 |
| | | | | 717/173 |
| 2016/0196131 | A1* | 7/2016 | Searle | H04L 65/40 |
| | | | | 717/173 |
| 2016/0196132 | A1* | 7/2016 | Searle | H04L 9/40 |
| | | | | 717/173 |
| 2016/0231997 | A1 | 8/2016 | Mihara et al. | |
| 2016/0234686 | A1* | 8/2016 | Bone | H04L 63/061 |
| 2016/0294614 | A1* | 10/2016 | Searle | H04L 67/34 |
| 2016/0335070 | A1* | 11/2016 | Aw | G06F 21/51 |
| 2017/0308705 | A1* | 10/2017 | Karaginides | G06F 8/654 |
| 2019/0050217 | A1* | 2/2019 | Tatourian | G06F 8/65 |
| 2019/0095187 | A1* | 3/2019 | Benedek | G06F 9/44521 |
| 2020/0336895 | A1* | 10/2020 | Bartlett | H04L 9/3247 |
| 2021/0055927 | A1* | 2/2021 | Sarukkai | G06F 8/71 |
| 2021/0075794 | A1* | 3/2021 | Gazit | H04L 63/1408 |
| 2021/0119858 | A1* | 4/2021 | De Smet | H04L 41/082 |
| 2021/0125143 | A1* | 4/2021 | Bartlett | G06Q 10/0832 |
| 2022/0095698 | A1* | 3/2022 | Talbot | A24F 40/65 |
| 2022/0206864 | A1* | 6/2022 | Nadathur | G06F 8/63 |
| 2022/0207022 | A1* | 6/2022 | Wood | G06F 8/65 |
| 2022/0268916 | A1* | 8/2022 | Nagpal | H04R 1/406 |
| 2023/0229758 | A1* | 7/2023 | Terpstra | G06F 21/572 |
| | | | | 726/26 |
| 2023/0229778 | A1* | 7/2023 | Terpstra | H04L 9/3247 |
| | | | | 713/2 |

OTHER PUBLICATIONS

Khurram et al.: "Enhancing Connected Car Adoption: Security and Over The Air Update Framework", 2016 IEEE 3rd World Forum on Internet of Things (WF-IoT), Dec. 12-14, 2016, Reston, VA, USA, pp. 194-198.

Noblet et al.: "Assessing the Over-the-Air Software Download for Reconfigurable Terminal", IEE Colloquium on Personal Communications in the 21st Century (II) (Ref. No. 1998/242), Feb. 6, 1998, London, UK, pp. 6/1-6/6.

Stevic et al.: "IoT-based Software Update Proposal for Next Generation Automotive Middleware Stacks", 2018 IEEE 8th International Conference on Consumer Electronics—Berlin (ICCE-Berlin), Sep. 2-5, 2018, Berlin, Germany, pp. 1-4.

Varadharajan et al.: "Over-the-Air Updates for Robotic Swarms", IEEE Software ( vol. 35 , Issue: 2 , Mar./Apr. 2018 ), Jan. 12, 2018, pp. 44-50.

Wang, Dejun et al., "A Hierarchy Model for Dynamic Replacing of Distributed Components", International Conference on Advanced Engineering Computing and Applications in Sciences, Nov. 1, 2007, pp. 49-54, IEEE, Piscataway, NJ, USA.

* cited by examiner

NETWORK NODE FIRMWARE UPDATE

CROSS-REFERENCE TO RELATED APPLICATIONS

This application claims the priority under 35 U.S.C. § 119 of European Patent application no. 20161888.1, filed on 9 Mar. 2020, the contents of which are incorporated by reference herein.

This application claims the priority under 35 U.S.C. § 119 of European Patent application no. 19306347.6, filed on 16 Oct. 2019, the contents of which are incorporated by reference herein.

FIELD

This disclosure relates to an apparatus and method for updating the firmware version in a network node.

BACKGROUND

A node in network may require an update of the firmware used by the processor which may be provided via the network. For a wireless network this service is referred to as Over The Air (OTA) firmware upgrade.

SUMMARY

Various aspects of the disclosure are defined in the accompanying claims. In a first aspect there is provided client network node comprising: a processor; a non-volatile memory coupled to the processor and configured to store firmware executable by the processor, the firmware being divided into a plurality of binary large objects (blobs), each blob having an associated blob version, each blob version being associated with a firmware version; wherein the client network node is configured to update a firmware version by: receiving notification from a server network node of an updated version of a first blob and the compatible versions of the remaining blobs; determining a blob upgrade order from the first blob updated version, the remaining blobs compatible versions, and the remaining blobs current versions; upgrading each blob in the blob upgrade order; restarting the client after each blob upgrade.

In one or more embodiments, the client network node may be further configured to determine a blob upgrade order from the compatible versions of the remaining blobs by: generating a compatibility tree from the first blob updated version and the remaining blobs compatible versions; generating an upgrade list from the compatibility tree and the remaining blobs current versions; wherein each blob of the remaining blobs is included on the upgrade list if the compatibility tree blob version is newer than the current blob version; storing the upgrade list in the non-volatile memory.

In one or more embodiments, upgrading the blobs may further comprise for each blob in the upgrade list: downloading the blob into the non-volatile memory from a server network node updating the blob; deleting the blob from the upgrade list; and restarting the network node.

In one or more embodiments, the client network node may be further configured to abort the firmware upgrade in response to determining that more than one blob has to be replaced simultaneously to maintain compatibility.

In one or more embodiments, the non-volatile memory may comprise a bootloader region, a plurality of blob regions and a blob upgrade region, wherein the blob upgrade region size is greater than or equal to the maximum size of one blob.

In one or more embodiments, the blob upgrade region may be less than twice the maximum size of one blob.

In one or more embodiments, the client network node may be configured as a wireless network node and configured to over-the-air update the firmware.

In one or more embodiments, each blob over-the-air update may comprise an OTA file header, a compatibility list and a blob and wherein the client network node is configured to receive the compatibility list and to abort the blob download unless all the current versions of the remaining blobs are compatible.

In a second aspect there is provided a server network node comprising: a processor; a memory coupled to the processor and configured to store firmware for execution by a client network node, the firmware being divided into a plurality of blobs, each blob having an associated blob version, each blob version being associated with a firmware version; wherein the server network node is configured to: notify a client network node of a first blob updated version; in response to a request for the first blob updated version from the client network node transmit data comprising a blob compatibility list, the blob compatibility list including the versions of the remaining blobs.

In one or more embodiments, the server network node may be further configured to in response to a request for the first blob updated version to determine a blob upgrade order from the compatible versions of the remaining blobs by: generating a compatibility tree from the first blob updated version and the remaining blobs compatible versions; generating an upgrade list from the compatibility tree and the remaining blobs current versions; storing the upgrade list in the non-volatile memory; and transmitting the blobs to the client network node in the order determined by the upgrade list.

In a third aspect there is provided a network comprising at least one embodiment of the client network node coupled to at least one embodiment of the server network node.

In a fourth aspect there is provided a method of firmware update in a client network node, the firmware being divided into a plurality of blobs, each blob having an associated blob version, each blob version being associated with a firmware version, the method comprising: receiving notification from a server network node of an updated version of a first blob and the compatible versions of the remaining blobs; determining a blob upgrade order from the first blob updated version, the remaining blobs compatible versions, and the remaining blobs current versions; upgrading each blob in the blob upgrade order; restarting the client after each blob upgrade.

In one or more embodiments, determining a blob upgrade order from the compatible versions of the remaining blobs further may comprise: generating a compatibility tree from the first blob updated version and the remaining blobs compatible versions; generating an upgrade list from the compatibility tree and the remaining blobs current versions; wherein each blob of the remaining blobs is included on the upgrade list if the compatibility tree blob version is newer than the current blob version; storing the upgrade list in the non-volatile memory.

In one or more embodiments, upgrading the blobs may further comprise for each blob in the upgrade list: downloading the blob into the non-volatile memory from a server network node; updating the blob; deleting the blob from the upgrade list; and restarting the client network node.

In one or more embodiments, the firmware update may be an over-the-air update and wherein each blob over-the-air update comprises an OTA file header, blob compatibility data and a blob, and wherein the method further comprises receiving the blob compatibility data and aborting the blob download unless all the current versions of the remaining blobs in the network client node are compatible with the blob to be updated.

In a fifth aspect there is described a computer program product comprising instructions which, when being executed by a processing unit in a client network node, cause said processing unit to perform a firmware update in a client network node, the firmware being divided into a plurality of blobs, each blob having an associated blob version, each blob version being associated with a firmware version the firmware update comprising the steps of receiving notification from a server network node of an updated version of a first blob and the compatible versions of the remaining blobs; determining a blob upgrade order from the first blob updated version, the remaining blobs compatible versions, and the remaining blobs current versions; upgrading each blob in the blob upgrade order; restarting the client after each blob upgrade.

In a sixth aspect there is described a computer program product comprising instructions which, when being executed by a processing unit in a server network node configured to store firmware for execution by a client network node, the firmware being divided into a plurality of binary large objects (blobs), each blob having an associated blob version, each blob version being associated with a firmware version, cause said processing unit to: notify a client network node of a first blob updated version; and in response to a request for the first blob updated version from the client network node to transmit data comprising a blob compatibility list, the blob compatibility list including the versions of the remaining blobs.

BRIEF DESCRIPTION OF THE DRAWINGS

In the figures and description like reference numerals refer to like features. Embodiments of are now described in detail, by way of example only, illustrated by the accompanying drawings in which.

DETAILED DESCRIPTION

Figure 1:
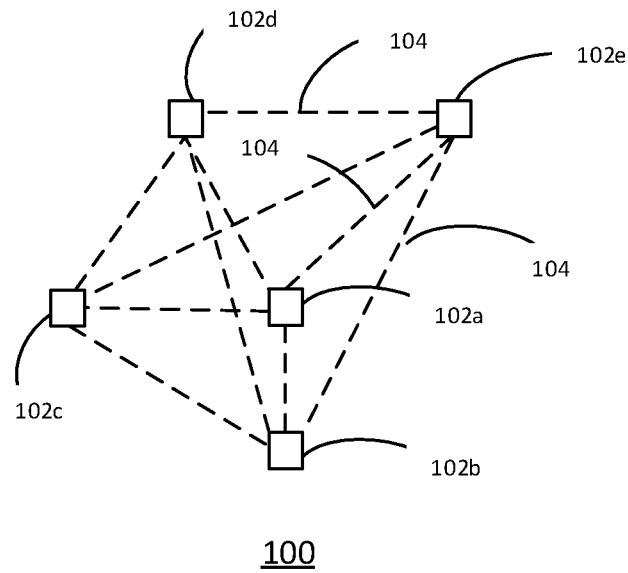
FIG. 1 Shows a typical wireless mesh network

FIG. 1 shows a typical mesh network 100. The mesh network 100 includes five nodes 102a, 102b, 102c, 102d, 102e. These nodes may typically include an RF transceiver to communicate with other nodes in the network. The allowed communication paths for the mesh network are illustrated by the dashed lines 104. The mesh network 100 as illustrated may be referred to as a full mesh network as all nodes can communicate directly with all other nodes. Any of the nodes 102a-e may act as a client or a server. In other network topologies some nodes may be clients or servers. During an OTA firmware update, one of the nodes in the mesh network may have an update firmware image available and acts as the OTA server to distribute that image to the other nodes in the network.

Figure 2:
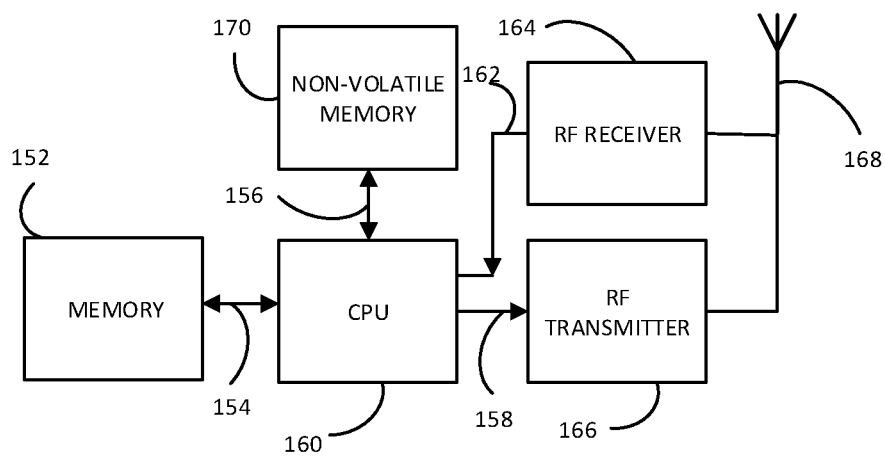
FIG. 2 illustrates a wireless network node configured to upgrade firmware according to an embodiment.

FIG. 2 shows a RF transceiver 150 according to an embodiment which may be a network node for example in the wireless mesh network 100. The RF transceiver 150 may be configured as a client or a server. The RF transceiver 150 may have a memory 152, a non-volatile memory 170, a processor 160, an RF transmitter 166, an RF receiver 164, and an antenna 168. The processor 160 may be coupled to the memory 152 via communication bus 154 and the non-volatile memory 170 via the communication bus 156. The processor 160 may have an output 158 connected to the RF transmitter 166. The processor 160 may have an input connected to the output 162 of the RF receiver 164.

In operation, the RF transceiver 150 may receive data via the antenna 168 and the RF receiver 164. The received data may be processed by the processor 160. The processor 160 may generate data for transmission to another node in the network via the RF transmitter 166 and the antenna 168. In some examples the processor 160 of the RF transceiver 300 may be coupled to a lighting circuit and/or a heating control circuit (not shown). Alternatively, or in addition, in some examples, the RF transceiver 150 may be connected to a temperature sensor and/or a motion sensor (not shown). Alternatively, or in addition, in some examples, the RF transceiver 150 may be connected to a current sensor for measuring electrical current (not shown). In some examples, the RF transceiver 150 may be incorporated into a lighting control luminaire, smart meter, or heating controller or other Internet of Things (IOT) device that is included in a mesh network.

In other examples a wired network node may be implemented with a transceiver similar to RF transceiver 150 with the RF receiver 164 and RF transmitter 166 replaced with a wired network interface.

The firmware which includes software executed by the processor 160 for controlling the operation of the RF transceiver 150 is stored in non-volatile memory 170 for example flash memory.

For a network connecting several nodes which may be for example a mesh wireless network 100 as shown in FIG. 1, during a firmware upgrade service some nodes (servers) send firmware upgrade to other nodes (clients) through the network. For a wireless network, this service is called Over The Air (OTA) firmware upgrade.

For a firmware update, the firmware is divided up into a number N of Binary Large OBjects referred to herein as blobs. A blob is a binary object which may hold a variable amount of binary data. The blob size may vary dependent on the size of the available memory. In some examples a blob may have a size greater than 1 Kbyte. In some examples, a blob may have a size in the range of 8 Kbytes and 170 Kbytes. In other examples a blob may have a maximum size greater than 170 Kbytes for example 16 Mbytes. The firmware has a version number and each blob is assigned its own version number which is incremented for each new blob version. If changes are made in several blobs and break compatibility with a previous firmware version, all related blob upgrades must be associated with new version numbers. Each change made to a blob results in a version number increment for that blob.

The version number is contained in the blob itself. The list of the latest versions numbers of other blobs that are compatible with a given blob may be embedded in the OTA file that contains this blob. Each blob is then transmitted within a respective OTA file. An OTA client can upgrade its firmware with a blob and reboot only if all blobs remain compatible.

Figure 3:
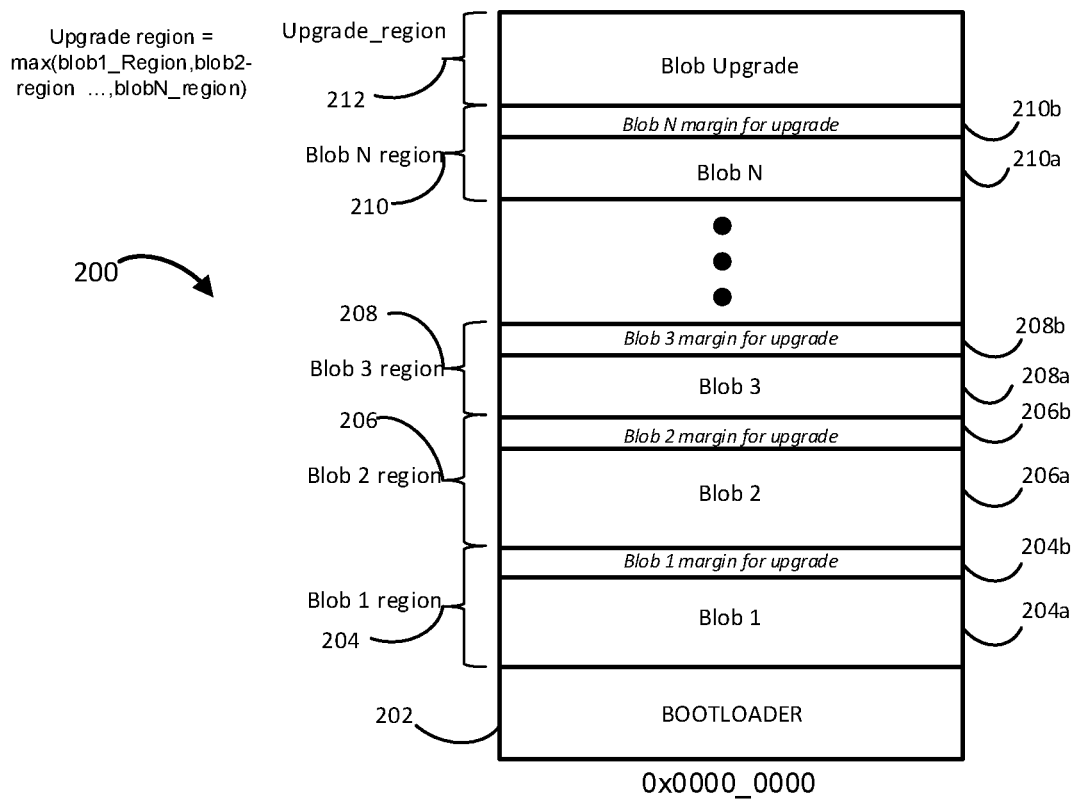
FIG. 3 shows an example partition of the non-volatile memory for the embodiment of FIG. 2

FIG. 3 shows an arrangement of the firmware 200 in the regions of the non-volatile memory 170. The non-volatile memory has a boot loader region 202 and a number N of blob regions 204, 206, 208, 210. Each blob region includes an area where the blob version associated with the current firmware version is stored 204a, 206a, 208a, 210a and a region to allow for increased blob size 204b, 206b, 208b, 210b. A blob upgrade region 212 has a size which is greater than or equal to the maximum size of any of the blob regions. If there is a new blob available in the blob upgrade region 212, the boot-loader firmware when executed on the processor copies the upgrade blob to the appropriate blob region. The combination of all blobs is required to be able to start the network node. The number of blobs that can be upgraded simultaneously is determined by the size of the blob upgrade region 212.

Figure 4:
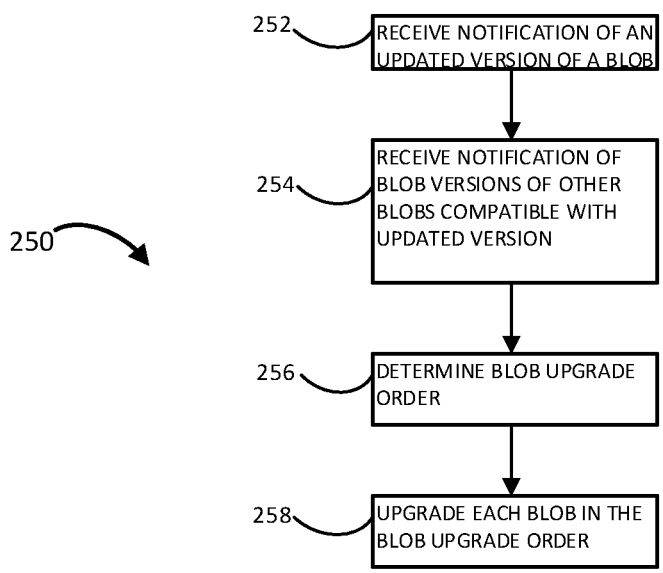
FIG. 4 illustrates a method of selective firmware update according to an embodiment.

FIG. 4 shows a method of selective over the air firmware update according to an embodiment 250. In step 252 a network client node may receive notification of an updated blob image from a network server node. In step 254 the network client node may receive notification of the versions of all remaining blobs which are compatible with the updated blob version. In step 256 a blob upgrade order may be determined from the compatibility information. Step 256 may include identifying whether a blob upgrade is possible if there is an incompatibility identified between blob versions In step 258 one or more blobs are applied to the firmware image in the client non-volatile memory. After each blob is applied the network node client is updated.

By selectively updating the firmware one blob at a time, the additional amount of non-volatile memory required for each update may be restricted to the maximum expected size of a single blob. The OTA client or the OTA server may both implement method 250 that generates the ordered blobs versions list which may be referred to as the upgrade list. The upgrade list may be applied prior to updating a given version of blob. This method 250 guarantees that the OTA client node can still reboot after each blob upgrade. If the method 250 results in an invalid upgrade list, then it means that at least 2 blobs have to be upgraded at the same time before a reboot is possible. In this case there is a cross-compatibility issue because 2 blob versions have to be flashed together before the OTA client can reboot properly. If only one of the 2 blobs versions is flashed, then the OTA client may not be able to restart and function normally In the case where the non-volatile memory only has enough size for one blob, the upgrade is not possible. In that case each blob version appears in the compatibility list of the other blob version and there is an invalid upgrade list so the upgrade process is aborted.

Downgrade of a blob version is not allowed as the methods described when used by the OTA client to build the upgrade list assume that blobs versions always increase. If an older version of a blob has to be flashed, then the same blob binary should be assigned a new version number and a new OTA file shall be generated.

Figure 5:
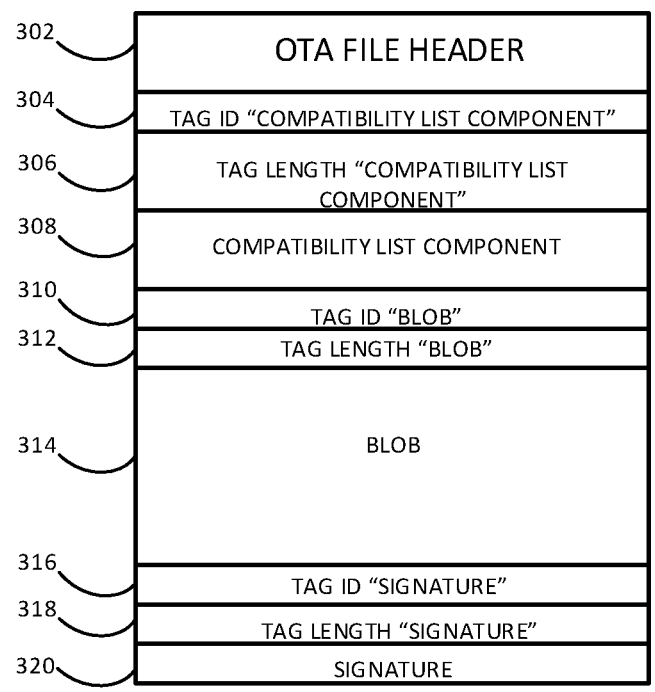
FIG. 5 shows an OTA file fields in type-length-value (TLV) format.

FIG. 5 shows an example OTA data file 300 which may be provided by a server to a client during a firmware update and may be used in one or more embodiments described in the present disclosure. The OTA file 300 may include an OTA file header 302 and a number of type-length-value (TLV) components. The OTA data file 300 includes a Tag ID for the compatibility list component 304, a Tag length for the compatibility list component 306, the compatibility list component 308, a tag ID for the Blob to be updated 310, a tag indicating the blob length 312, the blob to be updated 314. The OTA data file 300 further includes a tag ID for the signature 316, the tag length of the signature 318 and the signature itself 320. The OTA data file 300 may have two signatures. One signature authenticates the whole file 300. The second signature authenticates the compatibility only so that the client node only processes compatibility information from trusted devices. If the verification of the signature fails, the OTA file download should be aborted.

Further example details of each steps are described for a firmware upgrade where the firmware is divided into four blobs A, B, C and D. It will be appreciated that in other examples fewer or more blobs may be required. The following examples assume that a validation step has been carried out when an upgrade has been generating resulting in a modification to a blob such as for example a bug fix, or feature upgrade.

The 4 blobs have a version Avi, Bvj, Cvk and Dvl. In the examples illustrated it is assumed that
  Blobs B and D will not be changed after version vj and vl
  The compatibility list has been generated for Av(i, i−1, . . . , 1), Bv(j, j−1, . . . , 1), Cv(k, k−1, . . . , 1) and Dv(l, l−1, . . . , 1)
  Av1, Bv1, Cv1 and Dv1 denotes the oldest firmware blob version corresponding to the version flashed into the non-volatile memory during the manufacturing process.

A compatibility tree for a blob version may be generated using the following process:
  Each node of the tree is composed of a blob identifier and a version.
  Each child of a node is composed of N−1 children (N is the number of blobs that are required to boot the firmware).
  The children of a node are obtained from the compatibility list.
  The tree is built from the left to the right.
  Building a sub tree is stopped either when higher or equal blob version is already on the device or when a cycle is found on the tree, which means that the blob cannot be upgraded.

Figure 6:
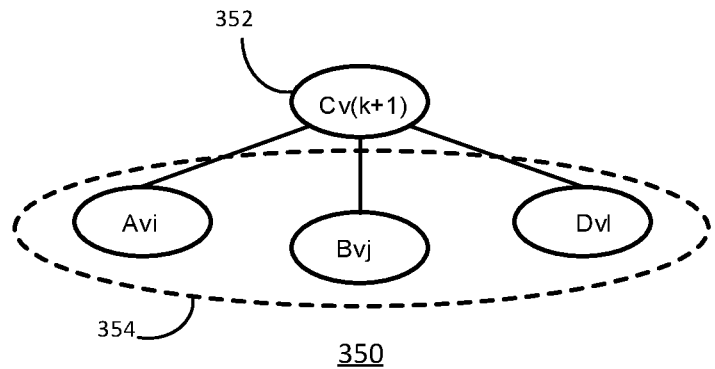
FIG. 6 shows an example compatibility tree generated by an embodiment of the network node.

FIG. 6 shows the compatibility tree 350 for a new blob upgrade to blob C from version k to version k+1 for a first case where the change to blob C does not imply modification in of the other blobs A, B, D. The root node 352 is denoted Cv(k+1) and the leaf nodes 354 include Avi, Bvj, Dvl The compatibility list for Cv(k+1) for case 1 is then:

$$Cv(k+1) = <Avi, Bvj, Dvl>$$

Figure 7A:
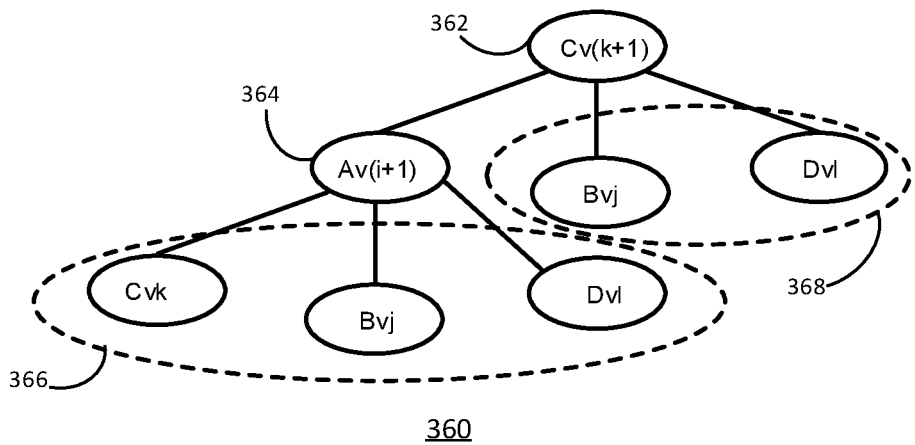
FIG. 7A shows a compatibility tree for firmware comprising four blobs according to an embodiment
Figure 7B:
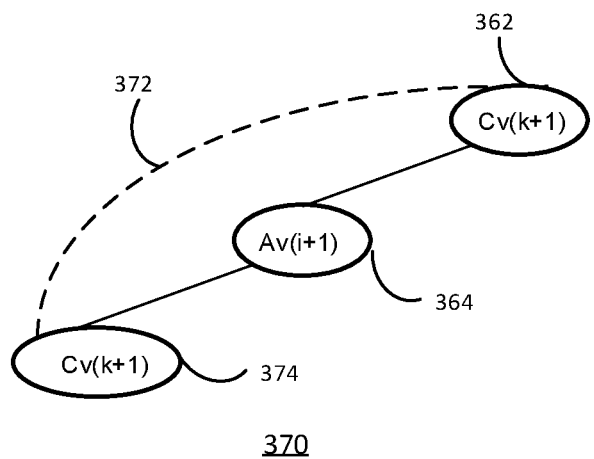
FIG. 7B shows an incompatible update condition for firmware comprising four blobs according to an embodiment

FIGS. 7A and 7B shows compatibility trees 360, 370 for a second case where the validation stage shows that the change in blob C will also require changes in another blob, for example in blob A.

In this case 2 the generated compatibility list will be:

$$Cv(k+1)=<Av(i+1),Bvj,Dvl>$$

Then, the compatibility list for Av(i+1) shall be generated dependent on two scenarios, denoted case 2.1 and case 2.2.

In case 2.1, if Av(i+1) is dependent on Cvk, the compatibility list will be Av(i+1)=<Cvk, Bvj, Dvl>.

FIG. 7A shows the compatibility tree 360 for case 2.1 and includes root node 362 corresponding to Cv(k+1). Node 364 having blob version Av(i+1) is a child node of root node 362. The compatibility tree 360 includes leaf nodes 336 including blobs Cvk, Bvj, Dvl and leaf nodes 338 including blobs Bvj, Dvl. The compatibility tree 360 build stops as all leaf nodes 336,338 are blob versions which are already installed. In this case 2.1 new changes imply that blob C and the blob A must be installed but only changes in A are required prior to upgrade of C:

The dependency list is: Cv(k+1)=<Av(i+1), Bvj, Dvl> and Av(i+1)=<Cvk, Bvj, Dvl>.

In case 2.2 if Av(i+1) requires Cv(k+1), the compatibility list will be Av(i+1)=<Cv(k+1), Bvj, Dvl>.

FIG. 7B shows the compatibility tree 370 for case 2.2 and includes root node 362 corresponding to Cv(k+1). Node 364 having blob version Av(i+1) is a child node of root node 362. Node 374 corresponding to Cv(k+1) is a child of node 364. In case 2.2 there is a cycle 372 in the compatibility tree 370 indicating a cross-dependency and so the compatibility tree build process stops.

The dependency list for case 2.2 is Cv(k+1)=<Av(i+1), Bvj, Dvl> and Av(i+1)=<Cv(k+1), Bvj, Dvl>. In case 2.2, an upgrade requires that blobs A and C are updated simultaneously which is not allowed and so the upgrade does not proceed.

This process of generating the compatibility list for a new blob upgrade applies for each oldest blob version and for any newer blob version.

Figure 7C:
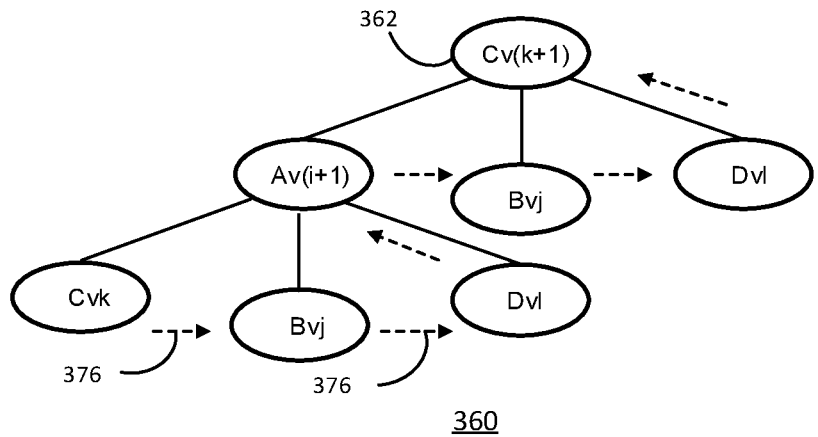
FIG. 7C shows the compatibility tree for firmware comprising four blobs according to an embodiment
Figure 7D:
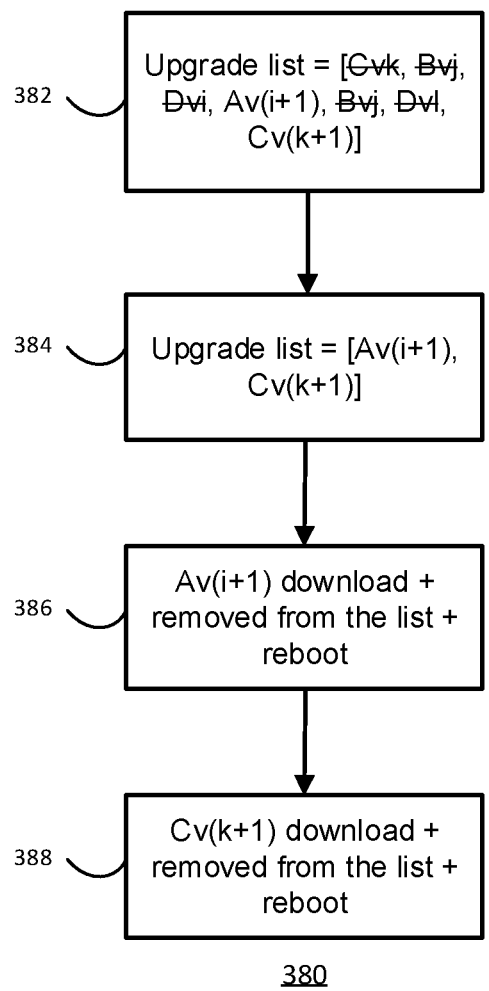
FIG. 7D shows a method of updating the firmware from the upgrade list according to an embodiment.

FIGS. 7C, 7D show the process for generating an upgrade list using the compatibility tree 360 as an example. Referring to FIG. 7C, as illustrated the upgrade list maybe generated by all leaf nodes from the left to the right starting at the lowest level of hierarchy of the compatibility tree up to the root node 362 indicated by the dashed arrows 376. For compatibility tree 360 this results in an initial upgrade list of [Cvk, Bvj, Dvl, Av(i+1), Bvj, Dvl, Cv(k+1)].

FIG. 7D which shows an example upgrade process 380 based on the initial upgrade list generated from compatibility tree 360. In step 382, the initial upgrade list is provided which in this example is [Cvk,Bvj,Dvl, Av(i+1), Bvj, Dvl, Cv(k+1)]. In step 384, blob versions which are either the same or older than currently installed versions are removed from the list. For this example, versions Bvj, Cvk, Dvl are removed so the resulting upgrade list is [Av(i+1), Cv(k+1)]. This upgrade list may be stored in non-volatile memory. The process then proceeds through the upgrade list from left to right installing the blobs one at a time. In step 386 blob Av(i+1) is downloaded and removed from the upgrade list which is updated in the non-volatile memory. The network client node may then be rebooted. In step 388 blob Cv(k+1) may be downloaded and removed from the update or upgrade list which is updated in the non-volatile memory. At this point, for this example, the upgrade list is empty so the process finished.

Figure 8:
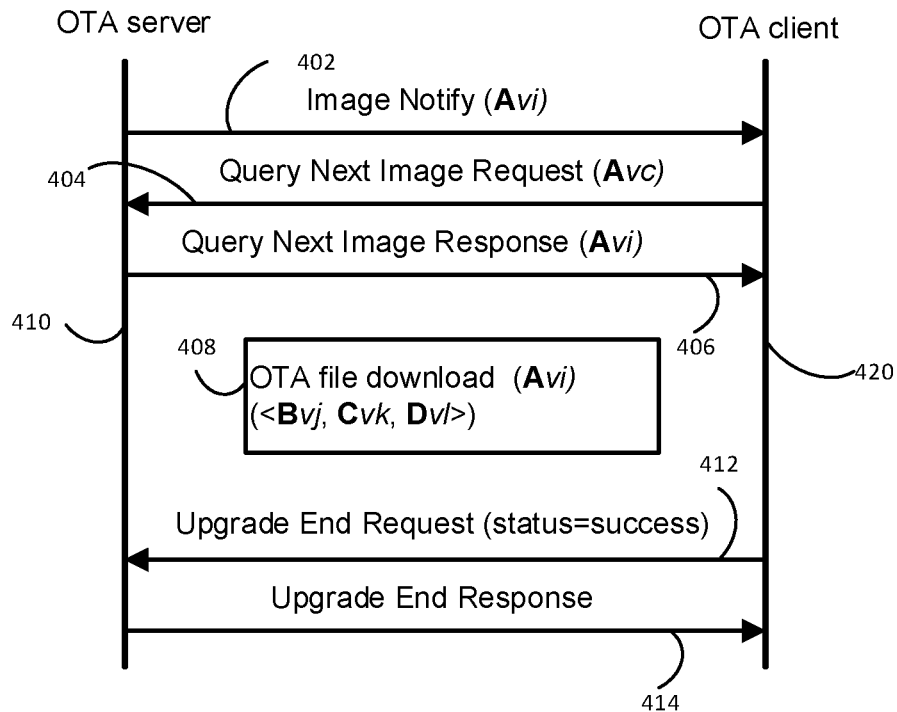
FIG. 8 shows a method of selective firmware update according to an embodiment

FIG. 8 shows a method 400 of OTA communication between a client and server on a Zigbee network used to build a compatibility tree by the OTA client. A similar method may be used in other wireless or wired networks. The scenario illustrated by method 400 is that a new blob version Avi is available and the OTA client has an older version Avc installed together with remaining blob versions having newer or equal versions to Bvj, Cvk, Dvl.

In step 402, OTA server 410 transmits an image-notify to OTA client 420 indicating that Avi is available. In step 404 OTA client 420 transmits a query-next-image-request indicating the current blob image version of Avc. In step 406 OTA server 410 transmits a query-next-image-response and an Avi OTA data file 408 is downloaded for example in a format shown in OTA file 300. The OTA client 420 then determines a compatibility tree from the compatibility list in the OTA file. For the example shown in method 400, the OTA client 420 is already running all blob versions or newer than in the compatibility list. The upgrade list only contains one node Avi and so the download can continue and the upgrade proceeds. In step 412 the OTA client 420 transmits an upgrade-end-request with status success to the OTA server 430. The OTA server 410 transmits an upgrade-end-response 414 to the OTA client 420 and the method terminates.

Figure 9:
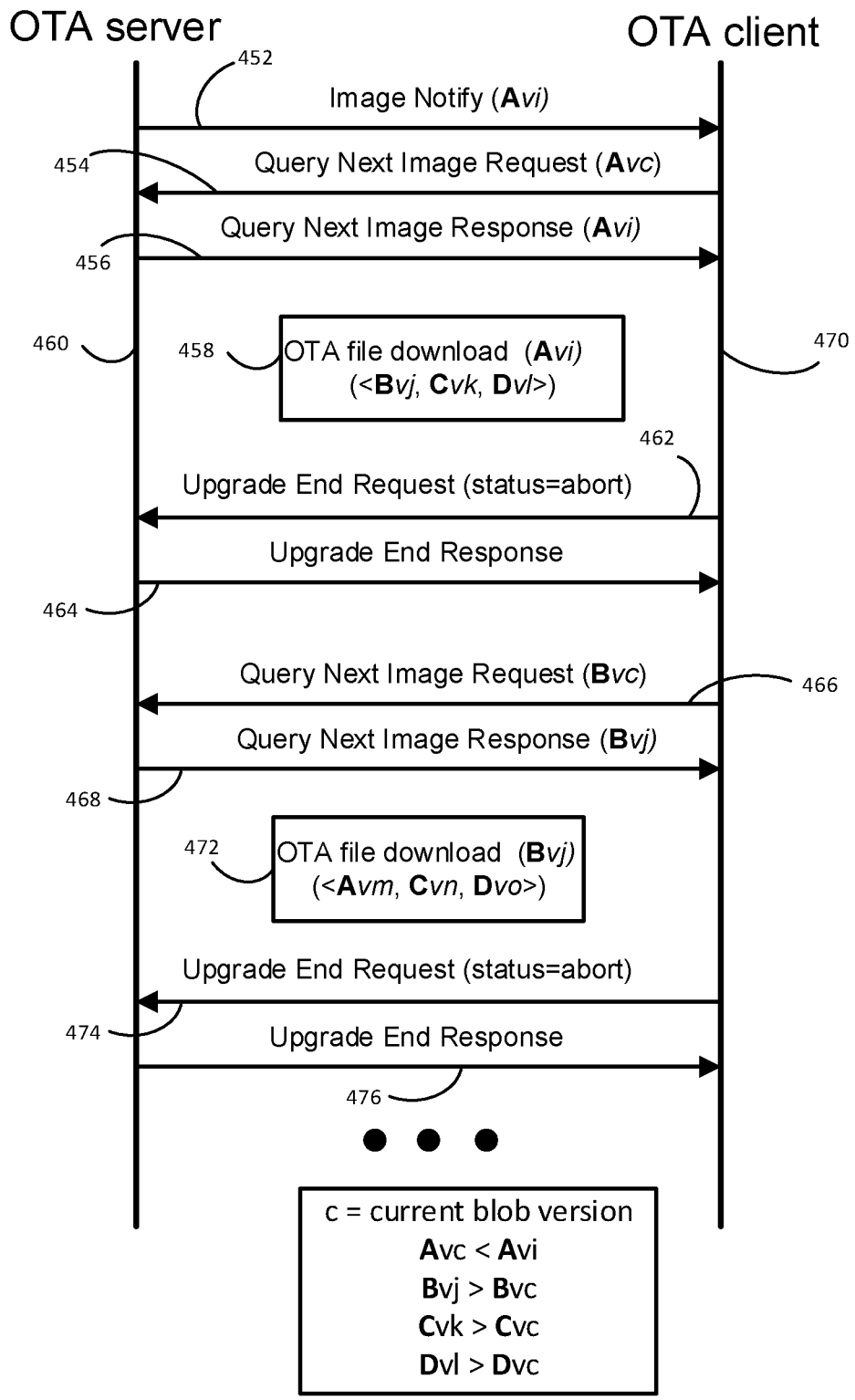
FIG. 9 shows a method of firmware compatibility tree generation according to an embodiment.

FIG. 9 shows a method 450 of OTA communication between a client and server on a Zigbee network used to build a compatibility tree by the OTA client. A similar method may be used in other wireless or wired networks. The scenario illustrated by method 450 is that a new blob version Avi is available and the OTA client has an older version Avc installed together with remaining blob versions B,C,D having older versions than Bvj, Cvk, Dvl.

In step 452, OTA server 460 transmits an image-notify to OTA client 470 indicating that Avi is available. In step 454 OTA client 470 transmits a query-next-image-request indicating the current blob image version of Avc. In step 456 OTA server 460 transmits a query-next-image-response and an OTA data file 458 is down loaded for example in a format shown in OTA file 300. The OTA client then determines a compatibility tree from the compatibility list in the OTA file. For the example shown in method 450, blob versions for blobs B,C,D on the OTA client 470 are older than blob versions Bvj, Cvk, Dvl in the compatibility list. In this case, in step 462 the OTA client 470 transmits an upgrade-end-request with status abort to the OTA server 460 as the compatibility tree is not complete. The OTA server 460 transmits an upgrade-end-response 464 to the OTA client 470.

As the compatibility tree is not complete, the method then proceeds to repeat the previous step for Bvj, Cvk, Dvl in order to build the other child nodes of Avi in the compatibility tree. The example is shown for blob Bvj but it will be appreciated that the steps will be repeated for Cvk, Dvl.

In step 466 OTA client 470 transmits a query-next-image-request for blob B sending the current version Bvc. In step 468 OTA server 460 transmits a query-next-image-response for blob Bvj and an OTA Bvj data file 472 is downloaded for example in a format shown in OTA file 300. The dependency in the OTA file 472 indicates that Bvj is dependent on Avm, Cvn, Dvo. The OTA client 470 then continues building a compatibility tree from the compatibility list in the OTA file. In this case, in step 474 the OTA client 470 transmits an upgrade-end-request with status abort to the OTA server 460 as the compatibility tree is not complete. The OTA server 460 transmits an upgrade-end-response 476 to the OTA client 470. If blob versions Avm, Cvn and Dvo are also newer than Avc, then the method 450 repeats a similar sequence for those blob versions until the leaf nodes of the compatibility tree are identified.

The method 450 continues until the compatibility tree is built by identifying all leaf nodes.

A node is a leaf if:
the OTA client is already running the blobs versions in its compatibility list or,
for all blobs versions in the compatibility list the same or a newer version of the blob is already a node in the tree.
The tree is built when all leaves are known.

The OTA client can then build the upgrade list with the leaves of the tree from the compatibility tree as illustrated for example in FIG. 7C.

Figure 10:
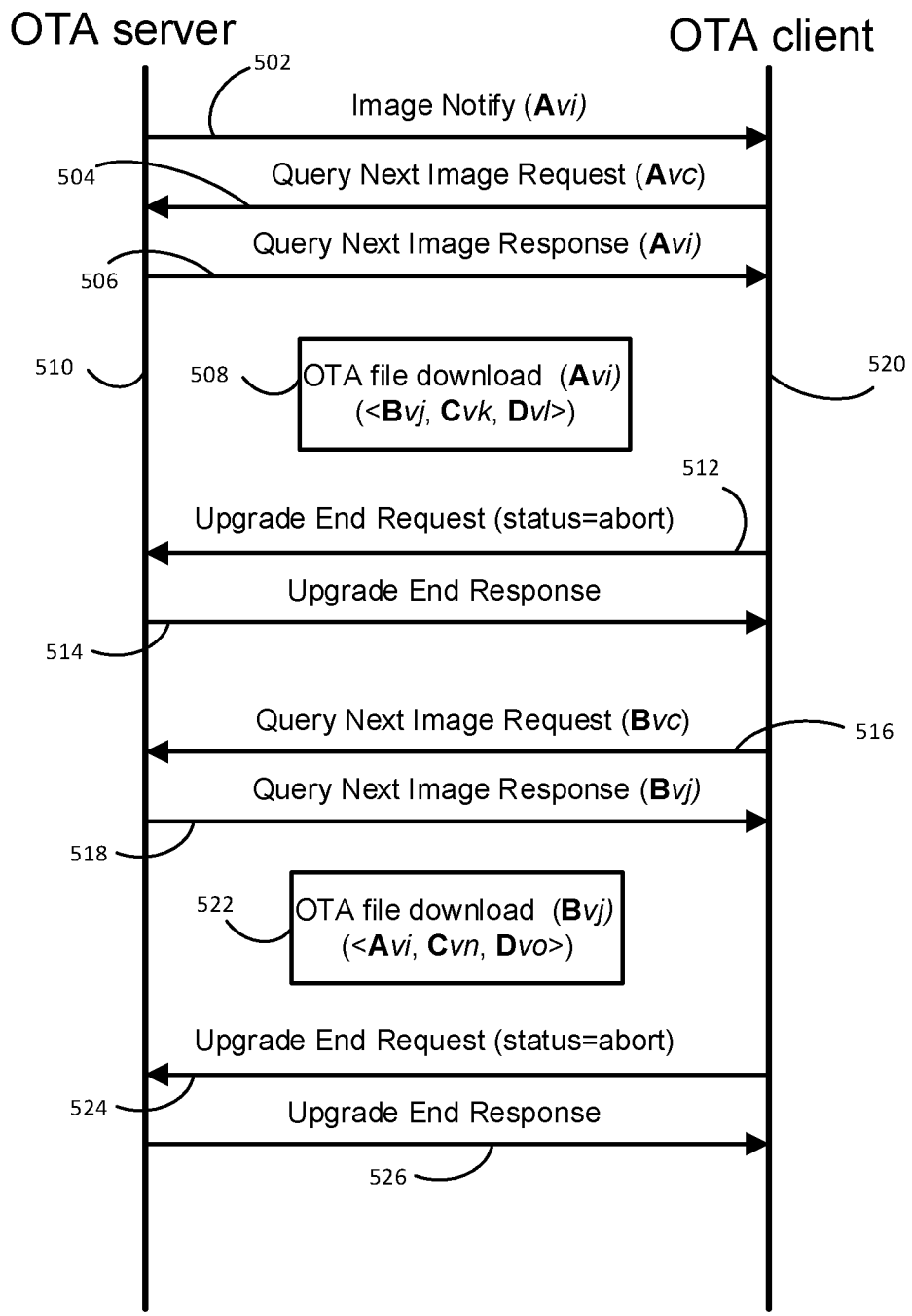
FIG. 10 shows a method of firmware compatibility tree error detection according to an embodiment.

FIG. 10 shows a method 500 of OTA communication between a client and server on a Zigbee network used to build a compatibility tree by the OTA client indicating an error condition. A similar method may be used in other wireless or wired networks. The scenario illustrated by method 500 is that a new blob version Avi is available and the OTA client has an older version Avc installed together with remaining blob versions B,C,D having older versions than Bvj, Cvk, Dvl.

In step 502, OTA server 510 transmits an image-notify to OTA client 520 indicating that Avi is available. In step 504 OTA client 520 transmits a query-next-image-request indicating the current blob image version of Avc. In step 506 OTA server 510 transmits a query-next-image-response and an OTA data file 508 is downloaded for example in a format shown in OTA file 300. The OTA client 520 then determines a compatibility tree from the compatibility list in the OTA file. For the example shown in method 500, blob versions for blobs B,C,D on the OTA client 520 are older than blob versions Bvj, Cvk, Dvl in the compatibility list. In this case, in step 512 the OTA client 520 transmits an upgrade-end-request with status abort to the OTA server 510 as the compatibility tree is not complete. The OTA server 510 transmits an upgrade-end-response 514 to the OTA client 520.

As the compatibility tree is not complete, the method then proceeds to repeat the previous step for Bvj, Cvk, Dvl in order to build the other child nodes of Avi in the compatibility tree.

In step 516 OTA client 520 transmits a query-next-image-request for blob B including the current version on the client Bvc. In step 518 OTA server 510 transmits a query-next-image-response for blob Bvj and a blob Bvj OTA data file 522 is downloaded for example in a format shown in OTA file 300. The dependency in the OTA file indicates that Bvj is dependent on Avi, Cvn, Dvo. In this case, there is a cyclic dependency on blob Avi which is an error condition and the upgrade procedure terminates. In step 524 the OTA client 520 transmits an upgrade-end-request with status abort to the OTA server 510 as the compatibility tree is not complete. The OTA server 510 transmits an upgrade-end-response 526 to the OTA client 520.

Figure 11:
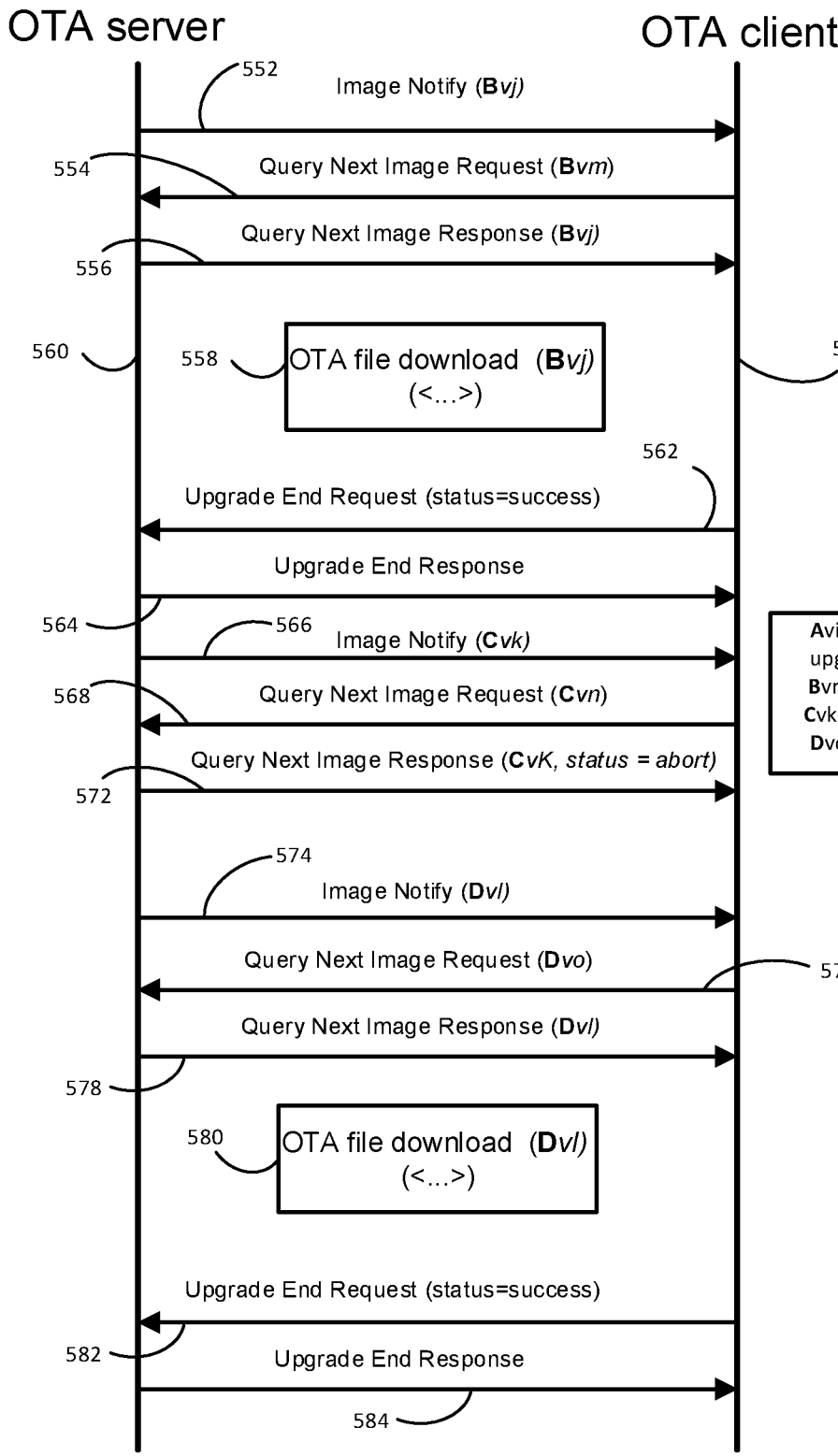
FIG. 11 shows a method of firmware update according to an embodiment.

FIG. 11 shows a method of OTA communication between a client and server on a Zigbee network 550 for blob upgrade. In this embodiment the compatibility tree is built by the OTA server followed by upgrading dependent blobs. This example assumes that:
the OTA server has to upgrade the OTA client with the blob Avi.
the OTA server has access to all OTA files of all blobs upgrades.
The OTA server can build the compatibility tree from the OTA files without any exchange with OTA client.

A node is a leaf if:
there a cross-compatibility issue for one of its potential child nodes, or
the blob version is the original version of the blob.
Then the OTA server can build an upgrade list and start the upgrade procedure with this list.

The OTA client gives its current blob version in the Query-next-image-request message, if:
the OTA client is running a newer or the same version of the blob, the OTA server can abort the procedure for this blob version and proceed with the next blob version in the upgrade list, or
if the OTA client is running an older version of the blob, then the OTA client proceeds with the upgrade of this blob. The OTA client will verify the compatibility list and may abort the procedure if one of the blob versions listed in the compatibility list is not supported. Once all blobs versions in the upgrade list are running on the OTA client, the required blob version can be upgraded (Avi).

The method 550 illustrates the scenario whereby the OTA client has to be upgraded with Avi and the OTA server has built the following upgrade list: [Bvj, Cvk, Dvl].

In step 552, OTA server 510 transmits an image-notify to OTA client 520 indicating that Bvj is available. In step 554 OTA client 570 transmits a query-next-image-request indicating the current blob image version of Bvm. In step 556 OTA server 560 transmits a query-next-image-response and an OTA data file 558 is downloaded for example in a format shown in OTA file 300. As all other blobs dependent on Bvj are already installed, the download and upgrade proceeds. In this case, in step 562 the OTA client 570 transmits an upgrade-end-request with status success to the OTA server 560 as the compatibility tree is not complete. In step 564 the OTA server 560 transmits an upgrade-end-response to the OTA client 570.

In step 566, OTA server 560 transmits an image-notify to OTA client 570 indicating that blob Cvk is available. In step 568 OTA client 570 transmits a query-next-image-request indicating the current blob image version of Cvn which in this example is a newer version than Cvk. In step 572 OTA server 560 transmits a query-next-image-response with status abort as no upgrade of blob C is necessary.

In step 574, OTA server 560 transmits an image-notify to OTA client 570 indicating that Dvl is available. In step 576 OTA client 570 transmits a query-next-image-request indicating the current blob image version of Dvo which is an older version than Dvl in this example. In step 578 OTA server 560 transmits a query-next-image-response and an OTA data file 580 is down loaded for example in a format shown in OTA file 300. As all other blobs dependent on Dvl are already installed, the download and upgrade proceeds. In this case, in step 582 the OTA client 570 transmits an upgrade-end-request with status success to the OTA server 560 as the compatibility tree is not complete. In step 584 the OTA server 560 transmits an upgrade-end-response to the OTA client 570.

Following upgrade of blobs B,C, and D, the upgrade of blob version Avi can proceed in a similar way (not shown).

The selective upgraded method and apparatus described herein allow nodes in the network that do not have enough memory to store a full firmware upgrade to be upgraded by running a finite number of selective firmware upgrades.

The methods guarantee that the firmware upgrade is safe, i.e. the node can still operate properly after any blob upgrade and reboot.

The methods and apparatus described may provide a reliable way to use the selective OTA upgrade to upgrade their devices in the field. It will be appreciated that other embodiments also be applied to wired networks where for example some network nodes have limited memory space available for firmware update.

An apparatus and method for updating the firmware version in a network node is described. the firmware is divided into a plurality of blobs, each blob having an associated blob version. Each blob version is associated with a firmware version. The method comprises receiving notification from a client server network node of an updated version of a first blob and the compatible versions of the remaining blobs. A blob upgrade order is determined from the first blob updated version, the remaining blobs compatible versions, and the remaining blobs current versions. Each blob is upgraded in the blob upgrade order. The client is restarted after each blob upgrade.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A client network node comprising:
   a processor;
   a non-volatile memory coupled to the processor and configured to store firmware executable by the processor, the firmware being divided into a plurality of binary large objects (blobs), each blob having an associated blob version, each blob version being associated with a firmware version;
   wherein the client network node is configured to update a firmware version by:
      receiving notification from a server network node of an updated version of a first blob and the compatible versions of the remaining blobs;
      determining a blob upgrade order from the first blob updated version, the remaining blobs compatible versions, and the remaining blobs current versions;
      upgrading each blob in the blob upgrade order;
      restarting the client after each blob upgrade.

2. The client network node of claim 1 further configured to determine a blob upgrade order from the compatible versions of the remaining blobs by:
   generating a compatibility tree from the first blob updated version and the remaining blobs compatible versions;
   generating an upgrade list from the compatibility tree and the remaining blobs current versions; wherein each blob of the remaining blobs is included on the upgrade list if the compatibility tree blob version is newer than the current blob version;
   storing the upgrade list in the non-volatile memory.

3. The client network node of claim 1 wherein upgrading the blobs further comprises for each blob in the upgrade list:
   downloading the blob into the non-volatile memory from a server network node;
   updating the blob;
   deleting the blob from the upgrade list; and
   restarting the network node.

4. The client network node of claim 1 further configured to:
   abort the firmware upgrade in response to determining that more than one blob has to be replaced simultaneously to maintain compatibility.

5. The client network node of claim 1 wherein the non-volatile memory comprises a bootloader region, a plurality of blob regions and a blob upgrade region, wherein the blob upgrade region size is greater than or equal to the maximum size of one blob.

6. The client network node of claim 5 wherein the blob upgrade region is less than twice the maximum size of one blob.

7. The client network node of claim 1 configured as a wireless network node and configured to over-the-air (OTA) update the firmware.

8. The client network node of claim 7 wherein each blob over-the-air update comprises an OTA file header, a compatibility list and a blob and wherein the client network node is configured to receive the compatibility list and to abort the blob download unless all the current versions of the remaining blobs are compatible with the blob to be updated.

9. A server network node comprising:
a processor;
a memory coupled to the processor and configured to store firmware for execution by a client network node, the firmware being divided into a plurality of binary large objects (blobs), each blob having an associated blob version, each blob version being associated with a firmware version;
wherein the server network node is configured to:
   notify a client network node of a first blob updated version;
   in response to a request for the first blob updated version from the client network node transmit data comprising a blob compatibility list, the blob compatibility list including the versions of the remaining blobs.

10. The server network node of claim 9 further configured to in response to a request for the first blob updated version to determine a blob upgrade order from the compatible versions of the remaining blobs by:
   generating a compatibility tree from the first blob updated version and the remaining blobs compatible versions;
   generating an upgrade list from the compatibility tree and the remaining blobs current versions;
   storing the upgrade list in the non-volatile memory; and
   transmitting the blobs to the client network node in the order determined by the upgrade list.

11. A network comprising the client network node of claim 1.

12. A method of firmware update in a client network node, the firmware being divided into a plurality of blobs, each blob having an associated blob version, each blob version being associated with a firmware version, the method comprising:
   receiving notification from a server network node of an updated version of a first blob and the compatible versions of the remaining blobs;
   determining a blob upgrade order from the first blob updated version, the remaining blobs compatible versions, and the remaining blobs current versions;
   upgrading each blob in the blob upgrade order;
   restarting the client after each blob upgrade.

13. The method of claim 12 wherein determining a blob upgrade order from the compatible versions of the remaining blobs further comprises:
   generating a compatibility tree from the first blob updated version and the remaining blobs compatible versions;
   generating an upgrade list from the compatibility tree and the remaining blobs current versions; wherein each blob of the remaining blobs is included on the upgrade list if the compatibility tree blob version is newer than the current blob version;
   storing the upgrade list in the non-volatile memory.

14. The method of claim 12 wherein upgrading the blobs further comprises
   for each blob in the upgrade list:
      downloading the blob into the non-volatile memory from a server network node;
      updating the blob;
      deleting the blob from the upgrade list; and
      restarting the client network node.

15. The method of claim 12 wherein the firmware update is an over-the-air update and wherein each blob over-the-air update comprises an OTA file header, blob compatibility data and a blob, and wherein the method further comprises receiving the blob compatibility data and aborting the blob download unless all the current versions of the remaining blobs in the network client node are compatible with the blob to be updated.

* * * * *